US008600158B2

(12) United States Patent
Li et al.

(10) Patent No.: US 8,600,158 B2
(45) Date of Patent: Dec. 3, 2013

(54) METHOD AND SYSTEM OPERATIVE TO PROCESS COLOR IMAGE DATA (75) Inventors: Jingquan Li, Auburn, NY (US); Stephen Patrick Deloge, Palmyra, NY (US)

(73) Assignee: Hand Held Products, Inc., Port Mill, SC (US)

( * ) Notice: Subject to any disclaimer, the term of this patent is extended or adjusted under 35 U.S.C. 154(b) by 353 days.

(21) Appl. No.: 12/947,055

(22) Filed: Nov. 16, 2010

(65) Prior Publication Data
US 2012/0121177 A1    May 17, 2012

(51) Int. Cl.
*G06K 9/00*    (2006.01)
(52) U.S. Cl.
USPC ........... 382/167; 382/162; 382/168; 382/237; 382/270; 382/274
(58) Field of Classification Search
USPC ......... 382/162, 167, 168, 237, 270, 274, 254; 358/1.2, 3.13, 472, 457; 345/596, 597, 345/598, 599, 600; 348/453
See application file for complete search history.

(56) References Cited

U.S. PATENT DOCUMENTS

| | | | |
|---|---|---|---|
| 4,695,884 A | 9/1987 | Anastassiou et al. | |
| 4,803,558 A | 2/1989 | Hiratsuka et al. | |
| 4,924,521 A | 5/1990 | Dinan et al. | |
| 4,977,605 A | 12/1990 | Fardeau et al. | |
| 4,996,603 A | 2/1991 | Kanemitsu et al. | |
| 5,301,271 A | 4/1994 | Hiratsuka et al. | |
| 5,568,571 A | 10/1996 | Willis et al. | |
| 5,768,403 A * | 6/1998 | Suzuki et al. | 358/2.1 |
| 6,172,773 B1 * | 1/2001 | Ulichney | 358/3.13 |
| 6,641,053 B1 | 11/2003 | Breidenbach et al. | |
| 6,757,438 B2 | 6/2004 | Graffagnino | |
| 6,876,763 B2 | 4/2005 | Sorek et al. | |
| 6,990,235 B2 | 1/2006 | Katsuyama | |
| 7,110,607 B2 | 9/2006 | Fujimoto et al. | |
| 7,123,768 B2 | 10/2006 | Mori | |
| 7,130,442 B2 | 10/2006 | Braudaway et al. | |
| 7,155,051 B2 | 12/2006 | Murakawa | |

(Continued)

FOREIGN PATENT DOCUMENTS

| | | |
|---|---|---|
| EP | 0349234 A2 | 1/1990 |
| EP | 1519564 A1 | 3/2005 |

(Continued)

OTHER PUBLICATIONS

Mar. 12, 2012 European Search Report in European Patent Application No. 11189062.0.

(Continued)

*Primary Examiner* — Ali Bayat (57) ABSTRACT

A method and system operative to process color image data are disclosed. In one embodiment, the method can comprise the steps of receiving color image data, determining the color ranges to be applied to the color image data, assigning each of the pixel positions in the image data a color range, assigning a different spatial binary pattern to each color range, and assigning each of the pixel positions a binary output pixel value that corresponds to the spatial binary pattern assigned to the color range assigned to that pixel position. The resulting binary image data can be written to a file for subsequent storage, transmission, processing, or retrieval and rendering. In other embodiments, a system can be made operative to accomplish the same.

25 Claims, 10 Drawing Sheets

(56) References Cited

U.S. PATENT DOCUMENTS

| | | | |
|---|---|---|---|
| 7,269,297 B2 * | 9/2007 | Loce et al. | 382/284 |
| 7,280,688 B2 | 10/2007 | Katsuyama | |
| 7,373,008 B2 | 5/2008 | Clouthier et al. | |
| 7,412,099 B2 | 8/2008 | D'Ortenzio et al. | |
| 7,415,154 B2 | 8/2008 | Hoogendijk | |
| 7,583,814 B2 | 9/2009 | Braudaway et al. | |
| 2002/0008715 A1 | 1/2002 | Sorek et al. | |
| 2002/0150276 A1 | 10/2002 | Chang | |
| 2003/0156753 A1 | 8/2003 | Fan et al. | |
| 2005/0157318 A1 * | 7/2005 | Harrington | 358/1.9 |
| 2005/0244060 A1 | 11/2005 | Nagarajan et al. | |
| 2006/0080031 A1 | 4/2006 | Cooper et al. | |
| 2006/0093383 A1 | 5/2006 | Buchheit | |
| 2006/0238784 A1 | 10/2006 | Lee | |
| 2007/0116367 A1 | 5/2007 | Yamamoto | |
| 2008/0135440 A1 | 6/2008 | Antal et al. | |
| 2008/0225342 A1 | 9/2008 | Lin | |
| 2008/0266580 A1 | 10/2008 | Choi et al. | |
| 2010/0046034 A1 | 2/2010 | Nagarajan et al. | |
| 2010/0092087 A1 | 4/2010 | Cooksey et al. | |
| 2010/0129004 A1 | 5/2010 | Ogawa | |

FOREIGN PATENT DOCUMENTS

| | | |
|---|---|---|
| EP | 1641282 A1 | 3/2006 |
| WO | WO02056255 A2 | 7/2002 |
| WO | WO-2006080031 A1 | 8/2006 |
| WO | WO-2006093383 A1 | 9/2006 |
| WO | WO-2008135440 A2 | 11/2008 |

OTHER PUBLICATIONS

Mar. 27, 2012 Communication pursuant to Article 94(3) EPC in European Patent Application No. 11189062.0.

Russ Adams, "Bar Code 1—A Web of Information About Bar Code", Dec. 31, 1995, www.adams1.com/pub/russadam/stack.html.

Ricardo L. De Queiroz et al., "Color to Gray and Back: Color Embedding Into Textured Gray Images", IEEE Transactions on Image Processing, vol. 15, No. 6, pp. 1464-1470, Jun. 2006.

Nov. 8, 2012 Invitation pursuant to Article 94(3) and Rule 71(1) EPC in European Application No. 11189062.

U.S. Appl. No. 12/947,076, filed Nov. 16, 2010 (25 pages).

Jun. 25, 2013 Notice of Allowance in U.S. Appl. No. 12/947,076.

Bo Yang, Pengfei Li, Xue Wang, "Image Coding for Binary Document Based on the Regional Features", Information Engineering and Computer Science, 2009. ICIECS 2009, International Conference on, IEEE, Piscataway, NJ, Dec. 19, 2009.

Dec. 6, 2012 Restriction Requirement in U.S. Appl. No. 12/947,076.

Jan. 30, 2013 Search Report in European Application No. 11189061.2, 3 pages.

Feb. 12, 2013 Communication Pursuant to Article 94(3) EPC in European Application No. 11189061.2.

Mar. 7, 2013 Office Action in U.S. Appl. No. 12/947,076.

* cited by examiner

METHOD AND SYSTEM OPERATIVE TO PROCESS COLOR IMAGE DATA

FIELD OF THE INVENTION

The present invention relates to image data in general and specifically to a method and system for image data processing.

BACKGROUND OF THE PRIOR ART

Image sensor based terminals are known to be used in industrial data collection applications. For example, image sensor based indicia reading terminals have been used for a number of years for purposes of decoding information encoded in bar code symbols. Commercially available image sensor based terminals can have color image sensors that are capable of taking color pictures. However, the resulting files used to store the colored images can sometimes be large, and can be of varied and sometimes proprietary formats that limit their usability to systems that require proprietary hardware or software to process them. Binary image data structures can be used to represent color, but are limited to only two colors, typically black and white. It would be useful to have a system and method for storing and retrieving color images in binary format, whereby each pixel in the image is represented by a single binary value while retaining the rich color information in the original image, thereby reducing storage space requirements and facilitating processing of that image by legacy systems designed to process binary files.

SUMMARY OF THE INVENTION

A method and system for representing a color image as binary data are disclosed. In one embodiment, the method comprises the steps of receiving a frame of color image data, the color image data comprising a plurality of input pixel values corresponding to a plurality of pixel positions in an image, wherein the input pixel values are represented as N-bit values, and wherein N>1, defining a plurality of color ranges, assigning each of the pixel positions to one of the color ranges based on the input pixel value for that pixel position, defining a plurality of spatial binary patterns, wherein each of the spatial binary patterns is different, assigning each of the plurality of color ranges to one of the spatial binary patterns, and assigning to each of the pixel positions an output pixel value representative of the spatial binary pattern assigned to that pixel position's assigned color range. In further embodiments, a method of writing the processed image data to a custom or standard file format, and subsequently retrieving that file and rendering the color image is disclosed. In still further embodiments, systems can be made operative to accomplish the same.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

A method and system operative to process color image data are disclosed. Color image data can be provided, for example, by a raw frame of image data or an image file having a custom or standardized image file format. Information in the image file can be extracted to obtain a frame of color image data. In one embodiment, the method comprises the steps of receiving a frame of color image data, the color image data comprising a plurality of input pixel values corresponding to a plurality of pixel positions in an image, wherein the input pixel values are represented as N-bit values, and wherein N>1, defining a plurality of color ranges, assigning each of the pixel positions to one of the color ranges based on the input pixel value for that pixel position, defining a plurality of spatial binary patterns, wherein each of the spatial binary patterns is different, assigning each of the plurality of color ranges to one of the spatial binary patterns, and assigning to each of the pixel positions an output pixel value representative of the spatial binary pattern assigned to that pixel position's assigned color range. In further embodiments, a method of writing the processed image data to a custom or standard file format, and subsequently retrieving that file and rendering the image is disclosed. In still further embodiments, systems can be made operative to accomplish the same.

Figure 1:
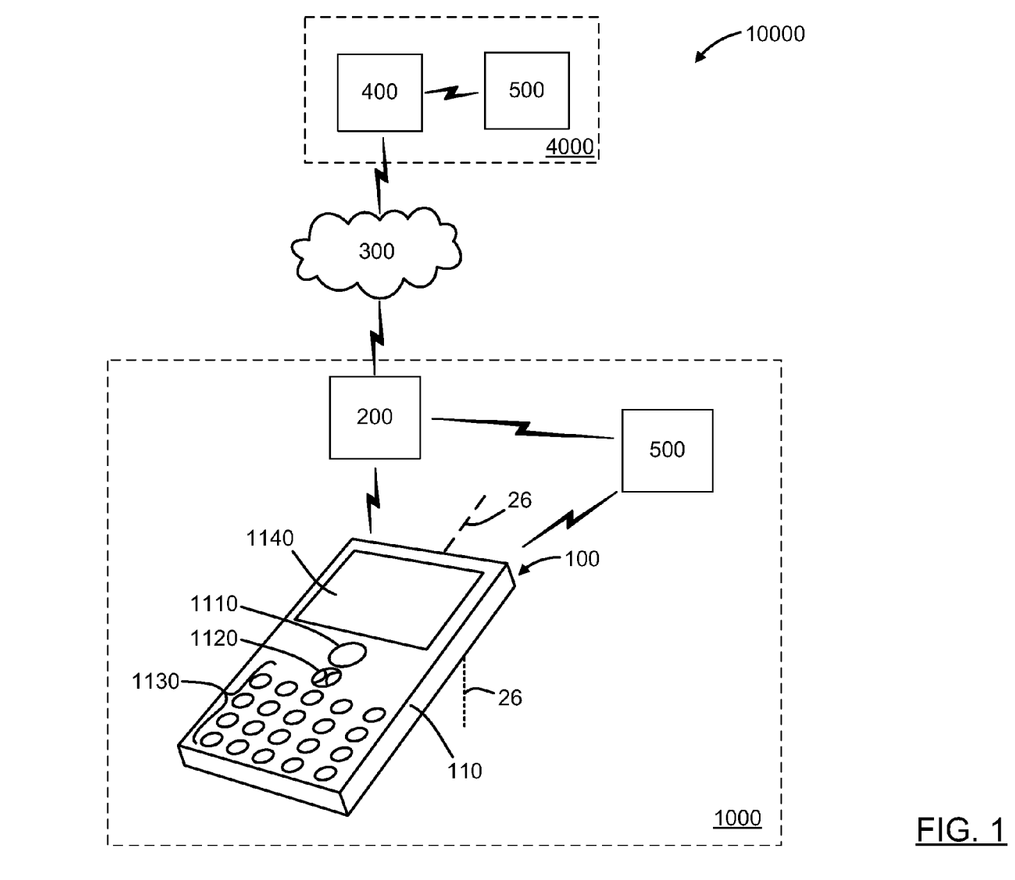
FIG. 1 is an exemplary system block diagram illustrating a data collection system in one embodiment.

In FIG. 1 there is shown a data collection system 10000. At a local facility 1000 there can be disposed a plurality of imaging reading terminals 100. In one example, local facility 1000 can be provided by a retail store. In another example, local facility 1000 can be provided by a warehouse. In another example, local facility 1000 can be provided by a health care facility. In one example, local facility 1000 can be provided by a personal residence. At local facility 1000 there can be included server 200 external to terminal 100.

Terminals 100 and server 200 can be in communication with a remote server 400 via network 300 which can be, e.g., a TCP/IP network. Server 400 can be disposed at a facility 4000 remote from facility 1000.

There can also be included in system 10000 one or more client computers 500. Client computer 500 in one embodiment can be provided by, e.g. a desktop personal computer, a laptop personal computer, or a smart phone, e.g. an IPHONE by Apple Computers, Inc. or a BLACKBERRY STORM by Research in Motion Limited.

Figure 2:
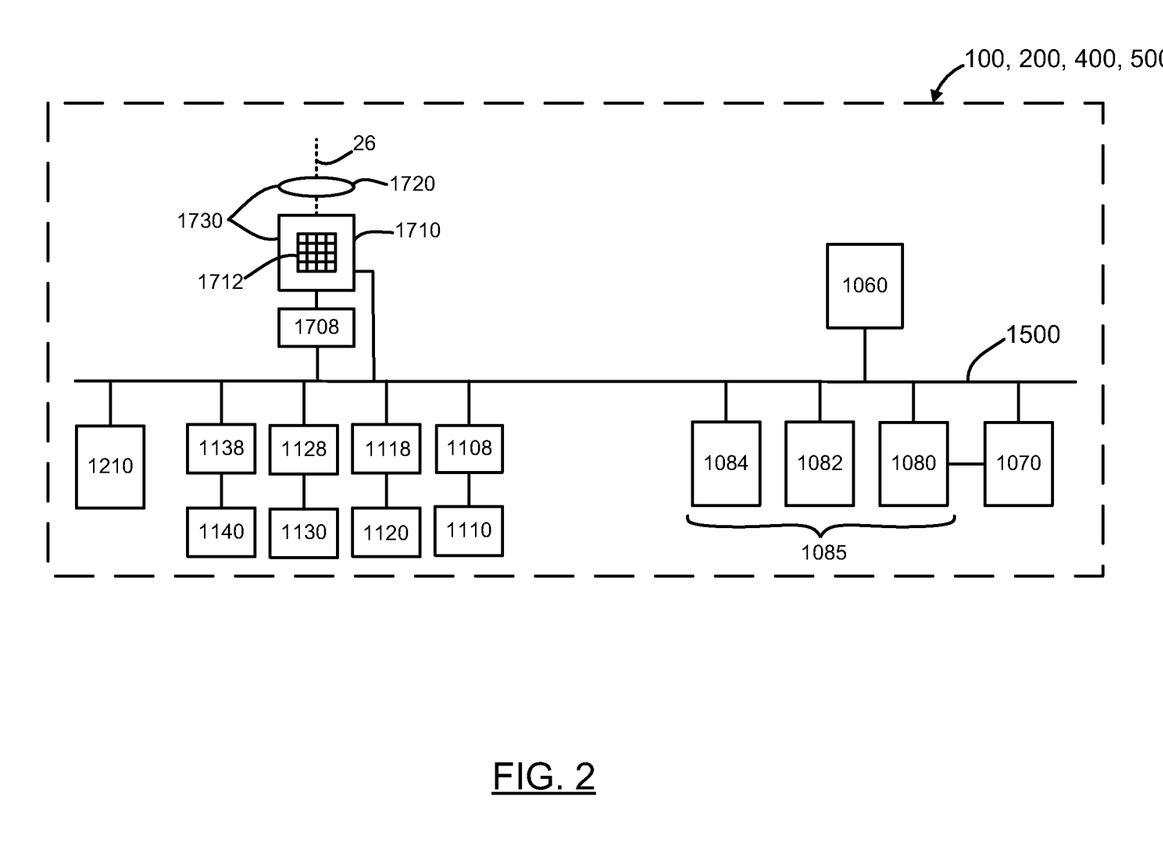
FIG. 2 is an exemplary block diagram of an imaging terminal in one embodiment having the components which can be incorporated in a server or client computer of a data collection system.

FIG. 2 is a block diagram illustrating exemplary components of terminal 100. In one embodiment, terminal 100 can include a CPU 1060 in communication with memory 1085 via system bus 1500. Memory 1085 can include one or more of a system volatile memory 1080, e.g. RAM, a system non-volatile memory 1082, e.g. ROM, and a long-term storage memory device 1084, e.g. a hard drive, CD, floppy and/or flash memory device. Memory 1080, memory 1082 and memory 1084 can be regarded as recording medium.

Referring to further aspects of terminal 100, terminal 100 can include a trigger 1110, pointer mechanism 1120, a keyboard 1130, and a display 1140. Each of the devices 1110, 1120, 1130, and 1140 can be communicatively coupled to system bus 1500 for communication with CPU 1060 via respective interfaces 1108, 1118, 1128, and 1138.

Referring to further elements of terminal 100, one embodiment of terminal 100 can include I/O device 1210 for providing communication with an external computer. I/O device 1210 can be a wire line communication I/O device, e.g. an Ethernet device or a USB I/O device, or a wireless communication device, e.g. an IEEE 802.11 communication interface device or a Bluetooth interface device. Terminal 100 can include more than one I/O device 1210.

Referring to further aspects of terminal 100, terminal 100 can include one or more imaging assemblies. In the specific example, terminal 100 includes a color imaging assembly 1730. Imaging assembly 1730 can include an image sensor pixel array 1712, a color image sensor 1710 and an imaging lens assembly 1720 for focusing light onto image sensor pixel array 1712. Imaging assembly 1730 can have an imaging axis 26. Image sensor 1710 can have color image sensor pixel array 1712 having a plurality of color pixels disposed in a 2D array having a plurality of rows and columns.

Image sensor pixel array 1712 can include, in one example, a Bayer pattern filter. Where image sensor pixel array 1712 includes a Bayer pattern filter, a color filter can be applied over each pixel of array 1712. A Bayer pattern filter includes the following color pattern, where G is green, B is blue, and R is red:

GRGR
BGBG
GRGR
BGBG

Thus, when image sensor pixel array 1712 includes a Bayer pattern, light incident on certain pixels can be expected to be light in the narrow band of the pixel's filter (red, green, or blue).

Image sensor 1710 can be provided in an image sensor integrated circuit having output processing circuitry for amplifying and digitizing image signals output by image sensor pixel array 1712. For capture of a frame of image data, image signals representing light incident on pixels of array 1712 can be read out of image sensor pixel array 1720, digitized and stored into system volatile memory 1080. Prior to read out, pixels of array 1720 can be exposed during an exposure period. Signals for control of image sensor 1710, e.g. readout and exposure signals, can be input by interface 1708, which can be communicatively coupled to system bus 1500 for providing communication with CPU 1060. Image terminal 100 can be operative so that terminal 100 captures a frame of image data in response to trigger 1110 being actuated. A frame captured into system volatile memory 1080 prior to further processing by CPU 1060 can be regarded as a raw frame of image data.

Figure 3:
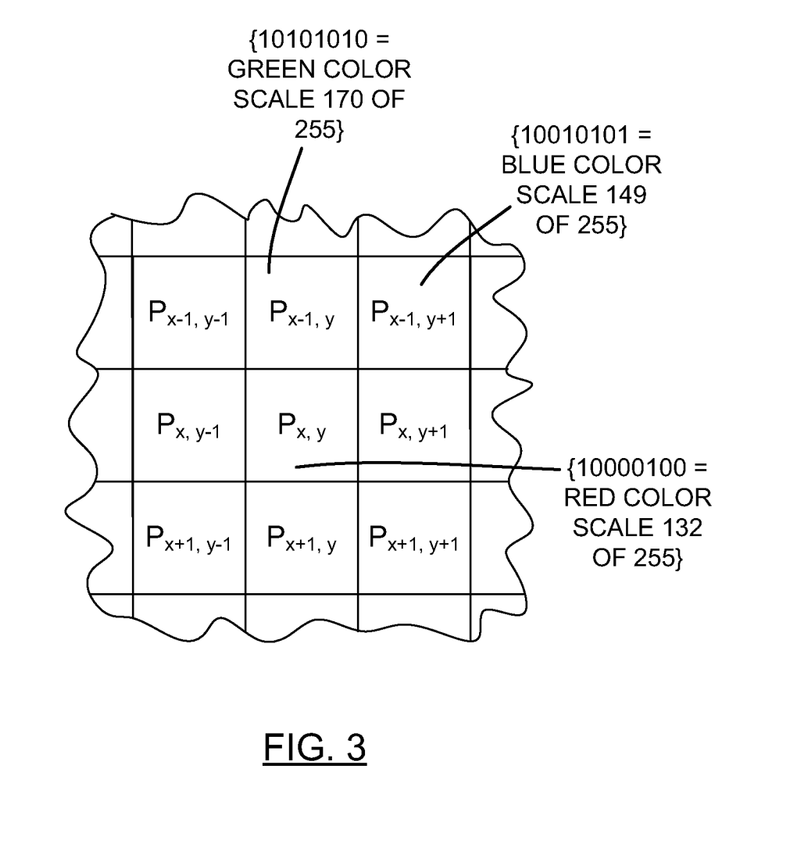
FIG. 3 is an exemplary representation in one embodiment of a raw frame that can be captured with use of a color imaging assembly.

A raw frame of image data captured utilizing color image array 1712 can have the format as shown in FIG. 3. The raw frame of image data can have a plurality of pixel positions (represented by a square in FIG. 3) each pixel position corresponding to a pixel position of image sensor array 1712, which represents a particular point region in target space. Each pixel position of the raw frame can have an associated N-bit input pixel value, N>1 representing a color scale value. In the specific example, i.e., N=8, each pixel position is represented by an 8-bit value. Each N-bit input pixel value represents light incident on a certain pixel of array 1712.

A color raw frame of image data is normally further processed by de-mosaicing and often color palette assignment. In de-mosaicing, a number of different algorithms can be performed on each pixel position to assign a red color scale component, a green color scale component, and a blue color scale component to that pixel position's input pixel value. For example, in FIG. 3, pixel position $P_{x-1,y}$ may receive a red color scale component of 25, a green color scale component of 170, and a blue color scale component of 45, which can be represented as $P_{x-1,y}$ (25, 170, 45). Likewise, in FIG. 3, pixel position $P_{x-1,y+1}$ may receive a red color scale component of 25, a green color scale component of 50 and a blue color scale component of 149, represented as $P_{x-1,y+1}$ (25, 50, 149). Having the RGB color scale components for each pixel position, the color to be assigned each pixel position can be mapped to a color palette which assigns each RGB combination an input color index value assigned to a particular color. For example, pixel position $P_{x,y}$ having RGB color scale components (132, 20, 25) may be assigned an input color index value of 45, which may be assigned to a particular color in a color palette, for example, pink.

For attempting to decode a bar code symbol, e.g. a one dimensional bar code symbol, a CPU of system 10000, e.g. CPU 1060 of terminal 100, can process image data of a frame corresponding to a line of pixel positions (e.g., a row, a column, or a diagonal set of pixel positions) to determine a spatial pattern of dark and light cells, and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. In one embodiment, system 10000 can be operative to capture a frame of image data and process the frame for attempting to decode the frame responsively to an actuation of trigger 1110. Where system 10000 processes a color frame of image data for attempting to decode a bar code symbol, terminal 100 can first transform the color image data into monochrome image data. Such transformation can comprise utilizing image data from only a single channel of pixel positions (e.g. by interpolating pixel values for blue and red pixel positions utilizing pixel values at green pixel positions so that an all green frame is output, which can be regarded as a monochrome frame of image data).

Terminal 100 can be operative so that responsive to an actuation of trigger 1110, terminal 100 captures a frame of image data and subjects image data of a frame to a decode attempt. Also, responsive to an actuation of trigger 1110, terminal 100 can format image data of a captured frame into a standard image format, e.g., BMP, PDF, JPG, TIF, and can transmit the formatted image file to an external computer, e.g., server 200, server 400, or client computer 500. A standard image file format can be in accordance with a standard developed by a standard forming entity, can be an open source standard, or can be a proprietary standard developed by an entity for use by third parties. A standard image file format can be viewed or used with a commercially other otherwise publicly accessible viewer.

FIG. 1 shows a physical form view of terminal 100 in one embodiment. Components described with reference to FIG. 2 can be supported within a portable hand held housing 110. Referring to further aspect of system 10000, each of server 200, server 400, and client computer 500 can include components described with reference to terminal 100. In some instances, terminal 100, server 400 and client computer 500 can have devices in addition to those shown in FIG. 2. In some instances servers 200, 400 and client computer 500 can have components deleted relative to those shown in FIG. 2 (for example, server 200 can be devoid of a display 1140 and imaging assembly 1730).

By virtue of their including at least a central processing unit (CPU) 1060 in combination with a memory 1085, each of terminal 100, server 200, server 400, and client computer 500 of system 10000 can be regarded as a "computer." Each computer of system 10000 can be configured in accordance with the TCP/IP protocol so that each computer of system 10000 can be in IP network communication with each other computer of system 10000. While system 10000 in one embodiment is described as having the elements 100, 200, 300, 400, 500, system 10000 can be implemented in such manner as to have less than all of the noted elements, e.g., only one of the noted elements.

Referring to further aspects of system 10000, a computer of system 10000, e.g. a terminal 100, server 200, server 400, or client computer 500 can be operative to perform processing as is described with reference to the flow diagrams of FIGS. 4 and 9. For example, for a computer to perform processing a CPU 1060 of the computer can execute program instructions. More than one computer can also perform the processing described herein. For example, a plurality of computers of system 10000 can perform a described processing in accordance with a multi-computer distributive processing scheme.

Figure 4:
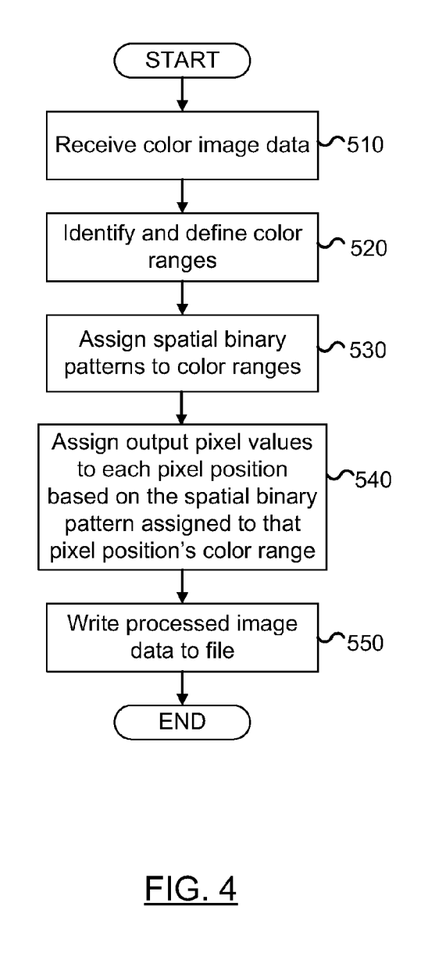
FIG. 4 is an exemplary flow diagram in one embodiment of the steps by which a color image can be converted to and stored as a binary file.

FIG. 4 is an exemplary flow diagram in one embodiment of the invention depicting a process by which a color image can be stored as a binary file. In step 510, color image data can be received and stored into memory 1085. Image data can be provided by, for example, a raw frame of image data or a formatted color image file stored in a custom or standard file format, e.g., BMP or JPG. For example, image data can be a run-time captured raw image frame, an image stored in computer memory, or an image loaded from a storage medium. Examples of images to which the process can be applied include colored maps, graphic charts, color barcodes, color artwork, print patterns, book covers, package designs, and the like. In particular, input pixel values representing color information for each of the pixel positions can be identified and stored, namely either the input color index value associated with each pixel position or the RGB color content for each. If the data loaded is RGB format, an additional step of first mapping that RGB color combination to a particular color index can be performed, such that at the end of step 510, each of the pixel positions is mapped to an input color index value. Initiation of step 510 and further processing of the image data can take place, for example, in response to actuation of a trigger 1110, automatically in response to system 10000 receiving a file, or at some other time in response to a user identified rule established through a user interface.

Figure 5:
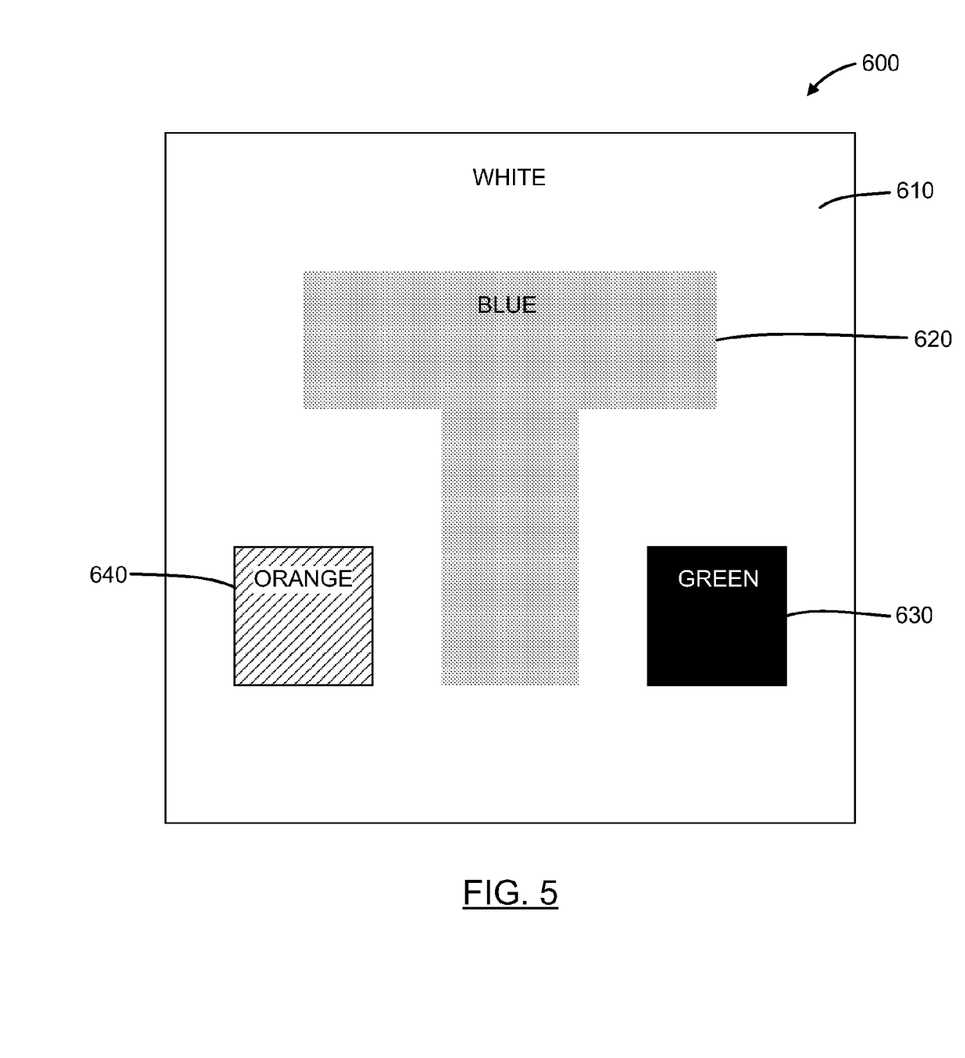
FIG. 5 is an exemplary color frame in one embodiment having three distinct colors.

FIG. 5 shows an exemplary color frame 600 that is twenty pixel positions wide by twenty pixel positions high having four spatial regions 610, 620, 630 and 640, each of which is a different color such that spatial region 610 appears white, spatial region 620 appears blue, spatial region 630 appears green, and spatial region 640 appears orange. Following step 510, the input color index for each of the pixel positions can be stored in system volatile memory 1080.

With reference again to FIG. 4, in step 520 the input color index values for each of the pixel positions within a frame can be grouped such that pixel positions having input color index values that fall within a given range of values can be considered the same color in order to reduce the overall number of colors represented by the image data. Accordingly, input color index values within the image data can be grouped into a number of different ranges, $C_0$ through $C_{X-1}$, where X represents the number of colors to be applied to a given frame. For example, a frame of color image data having pixel positions representing input color index values in a color palette having sixteen colors, 0 to 15, may be divided into four color ranges $C_o$, $C_1$, $C_2$, and $C_3$, where $C_0$ can be assigned input color index values in the range 0 to 3, $C_1$ can be assigned input color index values in the range 4 to 7, $C_2$ can be assigned input color index values in the range 8 to 11, and $C_3$ can be assigned input color index values in the range 12 to 16. The number of color ranges and the values assigned to each range can be arbitrarily chosen based on various factors, for example, the hardware and software limitations of a given data collection system 10000, the number and distribution of input color index values in the input frame data, or known optimal values for a given image type. The color assigned to each color range can be determined, for example, dynamically by the CPU 1060, automatically by system 10000 according to information stored internally within or externally to system 10000, or manually by a user selecting from a defined color palette. In one embodiment, reducing the number of colors in an image can be made optional such that the input color index value of each pixel position can be used without further reduction in the number of colors. Reducing the number of colors represented in an image can be used to remove noise data in the pixel information so that, for example, an image restored from the data will be closer to the original from which that image was taken, or to modify an image to make it more suitable for further processing or viewing in a given application.

Figure 6:
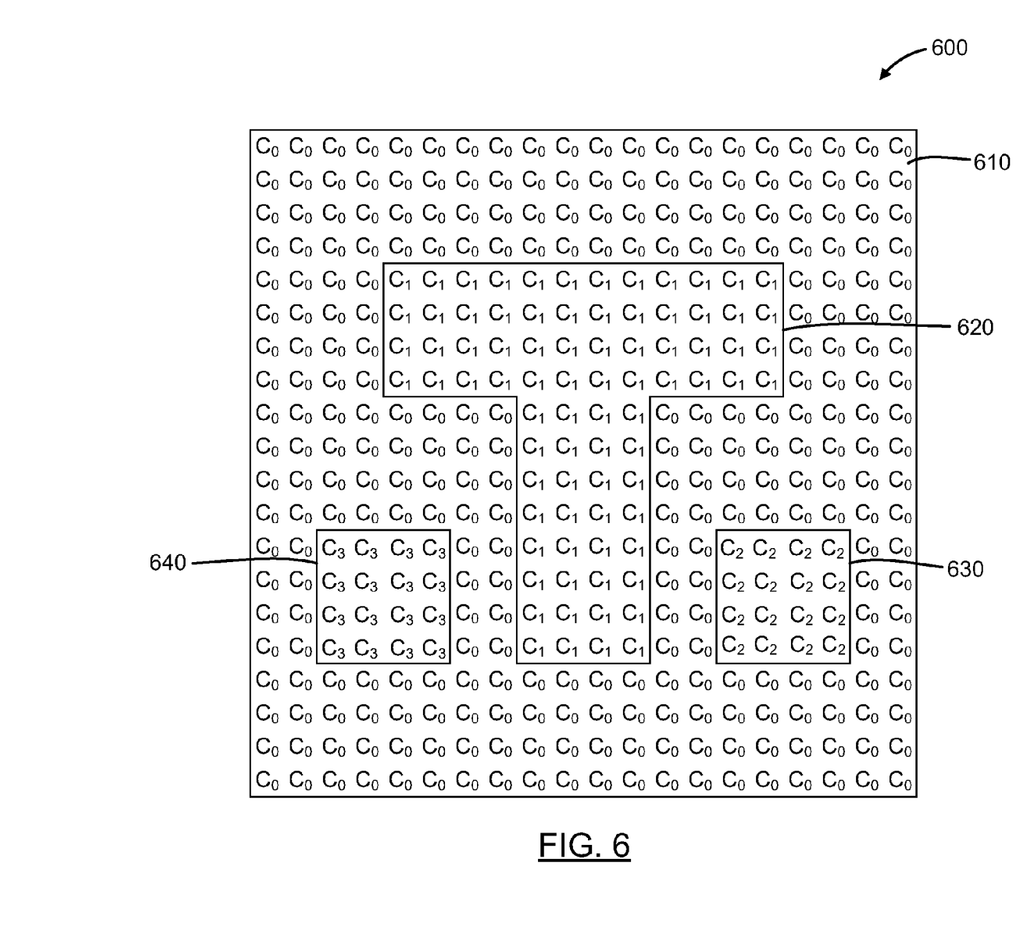
FIG. 6 is an exemplary graphical representation in one embodiment of the frame in FIG. 5 after each of the pixel positions has been assigned a color range.

Accordingly, CPU 1060 can process the image data stored in memory 1085 by assigning each pixel position to the color range, $C_0$ through $C_{X-1}$, which corresponds to that pixel position's input color index value. FIG. 6 is an exemplary graphical representation in one embodiment of the exemplary frame of FIG. 5 after each of the pixel positions has been assigned a pixel value range. In this embodiment, because each of the four spatial regions 610, 620, 630 and 640 are a different color, four different color ranges have been assigned to each of the pixel positions in that image. The CPU 1060 can store the color range assigned to each of the pixel positions in system volatile memory 1080.

Figure 7:
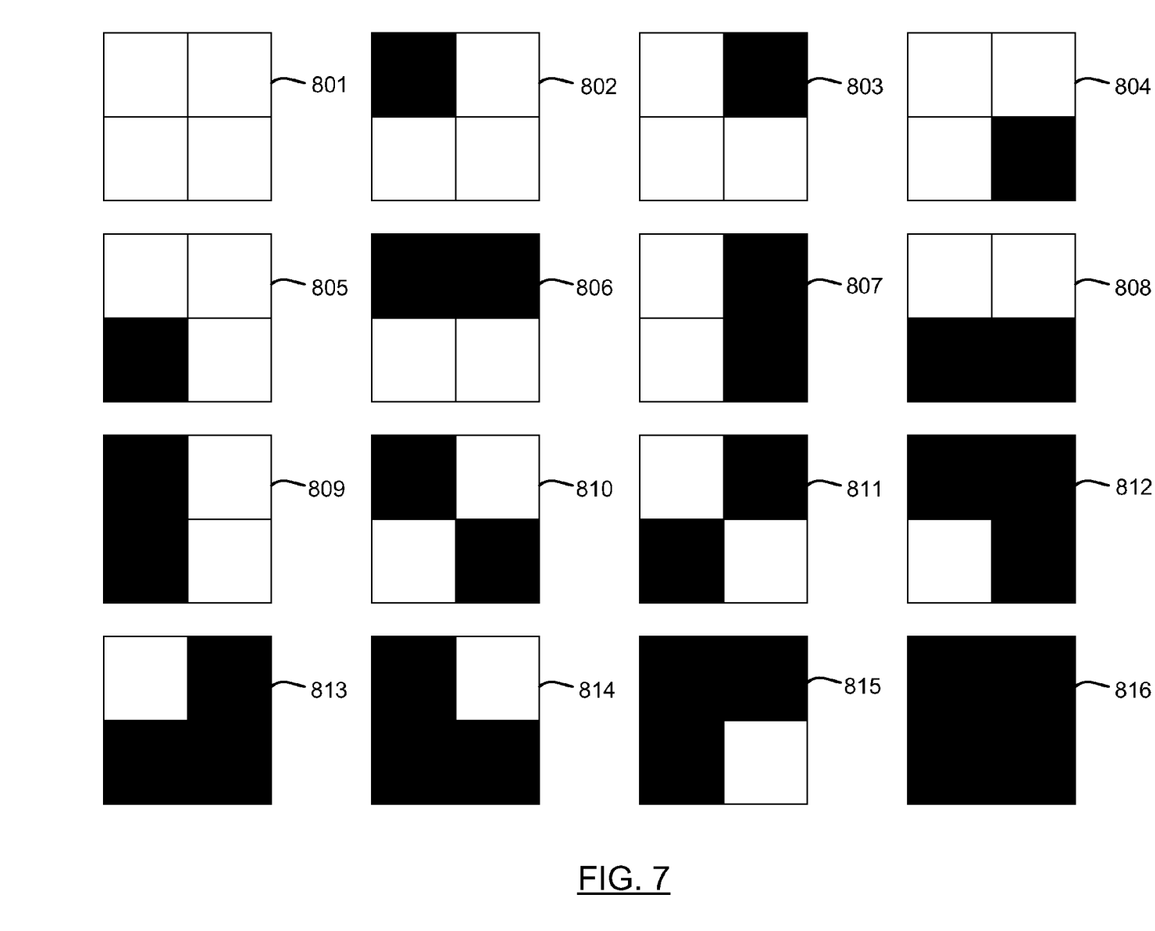
FIG. 7 is an exemplary graphical representation in one embodiment of the 16 different spatial binary patterns made possible using a two-by-two pixel window.

With reference again to FIG. 4, in step 530 each of the color ranges can be assigned a unique spatial binary pattern. Accordingly, output pixel values can be chosen such that the resulting binary sequence for pixel positions in the same color range generates a unique pattern when compared to the binary sequences for pixel positions in other color ranges. In one embodiment, binary patterns can be assigned based on various binary patterns possible within a W×H window in which W represents the width in pixels and H represents the height in pixels, both W and H being equal to or greater than 1. For example, FIG. 7 is an exemplary graphical representation in one embodiment of the 16 different binary patterns, 801 to 816, made possible using a two by two pixel window. A two by two pixel pattern can support images having 16 different colors, with smaller or larger windows being able to support fewer or additional colors, respectively. As the size of the window used increases, the resolution with which the spatial regions can be identified and represented decreases. For example, while using a 2 pixel by 2 pixel window allows for spatial binary patterns representative of 16 different colors, the assignment of color to pixel positions in an image frame is also performed by a window having a 2 pixel by 2 pixel resolution.

Figure 8:
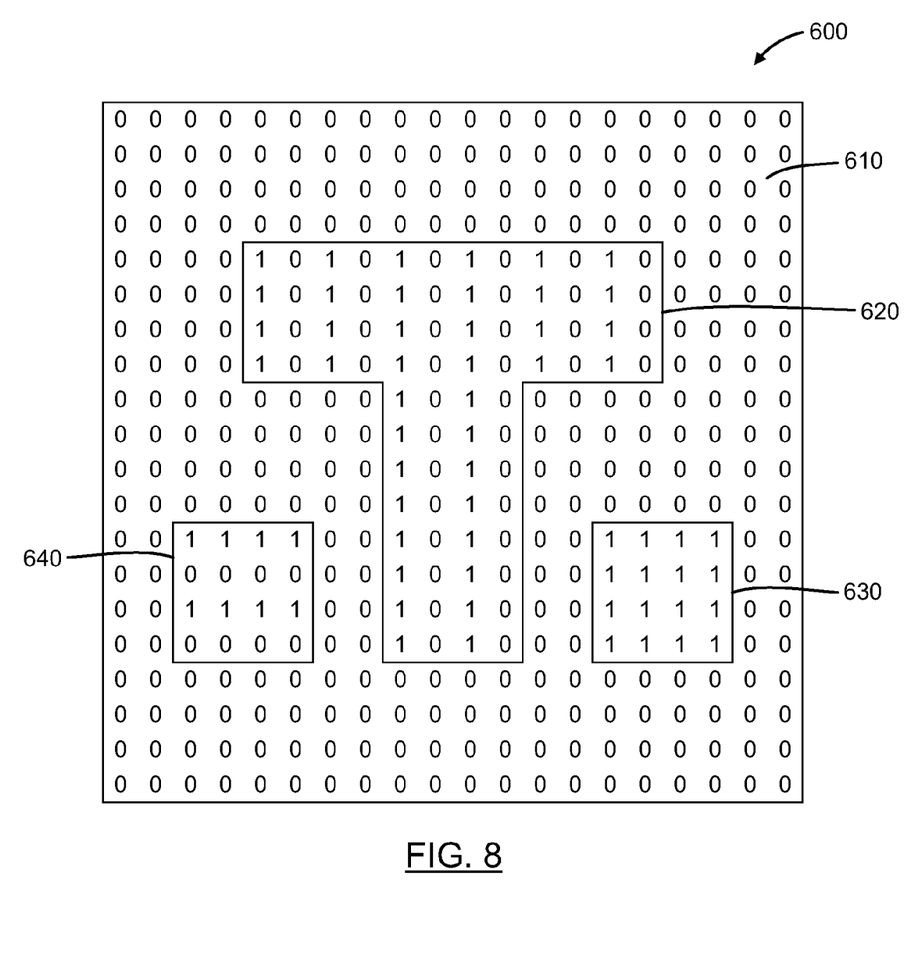
FIG. 8 is an exemplary graphical representation in one embodiment of the frame in FIG. 5 after each of the pixel positions has been assigned an output pixel value corresponding to the spatial binary pattern assigned to the color range for that pixel position.

With reference again to FIG. 4, in step 540, each of the pixel positions can be assigned a binary value based on that pixel position's assigned color range, $C_0$ through $C_{X-1}$. Accordingly, CPU 1060 applies a chosen binary pattern to the pixel positions within a given color range, assigning each of those pixel positions output pixel values that correspond to the selected binary pattern. Assignment of a particular pattern to a given color range can be determined, for example, dynamically by the CPU 1060, automatically according to information stored internally or externally to system 10000, or manually by a user either selecting from a group of available pattern choices, or by creating a custom pattern. FIG. 8 is an exemplary graphical representation of the exemplary image of FIG. 5 after each of the pixel positions has been assigned an output pixel value corresponding to each pixel position's assigned pixel value range. In this example, all of the pixel positions of spatial region 610, which was assigned range $C_o$ in step 530, can be assigned a value of 0 corresponding with pattern 801 in FIG. 7. Similarly, all of the pixel positions of spatial region 630, which was assigned range $C_2$ in step 530, can be assigned a value of 1, corresponding to pattern 816 in FIG. 7. For pixel positions in spatial region 620, a vertical pattern of alternating shaded and unshaded pixels can be applied such that shaded pixel positions are assigned a value of 1, while unshaded pixel positions are assigned a value of 0, corresponding to pattern 809 of FIG. 7. Finally, for pixel positions in spatial region 640, a horizontal pattern of alternating shaded and unshaded pixels can be applied such that shaded pixel positions are assigned a value of 1, while unshaded pixel positions are assigned a value of 0, corresponding to pattern 806 of FIG. 7. The CPU 1060 can store the assigned output pixel values of each pixel position in memory 1085, with the data containing a binary representation of the image such that each pixel position is represented only by either a 1 or a 0, while preserving color information in the original image.

Having assigned output pixel values to each pixel position, in step 550 the CPU 1060 can generate a binary file containing the processed image information stored in memory 1085 using any standard or custom file format. For example, the processed image information can be stored in a BMP file format containing the image data along with a header that stores general file information, detailed information about the image itself, for example the number of bits per pixel, here equal to 1, and the bitmap width and height, as well as information on the colors to be applied to each of the color ranges as defined by the various binary patterns. For example, in the four color image example shown in FIG. 5, the header may contain information on the four spatial binary patterns applied to the output pixel values, and a set of values establishing the colors to be applied to each. In other embodiments, colors can be determined dynamically by the CPU 1060 by deciding between several predetermined color options based on established parameters, or assigned a default color value. In other embodiments, information used to process the binary image data stored in the file can be retrieved from elsewhere internally or externally to system 10000.

Header information in standard file formats can be defaulted to standard or null values, or selected to suit particular processing needs. Use of a standard file format can allow the processed image data to be read and processed by legacy systems and other computers with standard viewers that are capable of accepting and processing that file format, such as a standard off-the-shelf bar code reader. Alternatively, the processed image data can be written to any custom file format. Enhanced functionality can be built into computers with customized viewers programmed to read and process such a custom file format, while processing capabilities when using standard file formats may be limited to the information and features associated with that chosen format.

Figure 9:
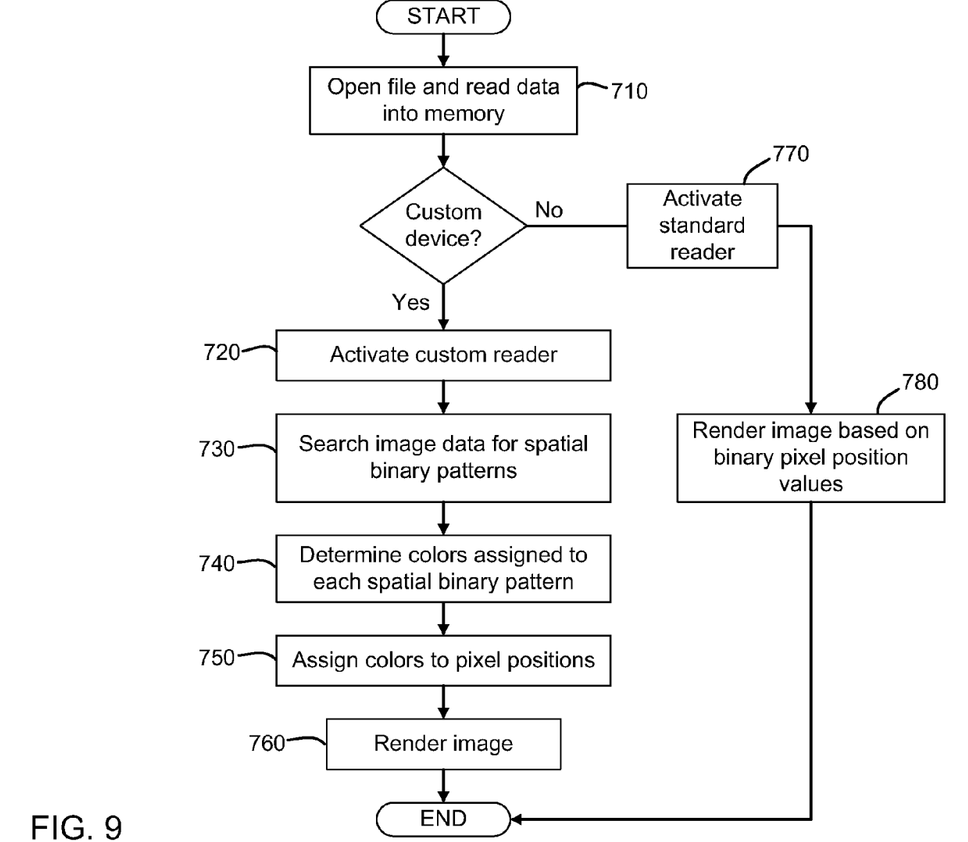
FIG. 9 is an exemplary flow diagram in one embodiment of the steps by which a file generated using the steps described in relation to FIG. 4 can be processed to render a color image.

FIG. 9 is an exemplary flow diagram in one embodiment depicting the steps by which a file generated using the steps described in relation to FIG. 4 can be processed to render an image. In step 710, CPU 1060 opens the file to be processed and reads the data into memory 1085. The information loaded can include the binary image data itself, as well as file header information used to process that image data. Subsequent processing of the image data can be dependent on whether a computer with a customized viewer specifically programmed to render the stored image is used, or whether a computer with a standard viewer is used. Because the image data is stored in a universal binary format with each pixel position represented by a single bit of data, namely a 1 or a 0, a computer with a standard viewer capable of reading and processing a given file format can be capable of rendering a representation of the image based on that image data even without customized processing capabilities.

Figure 10:
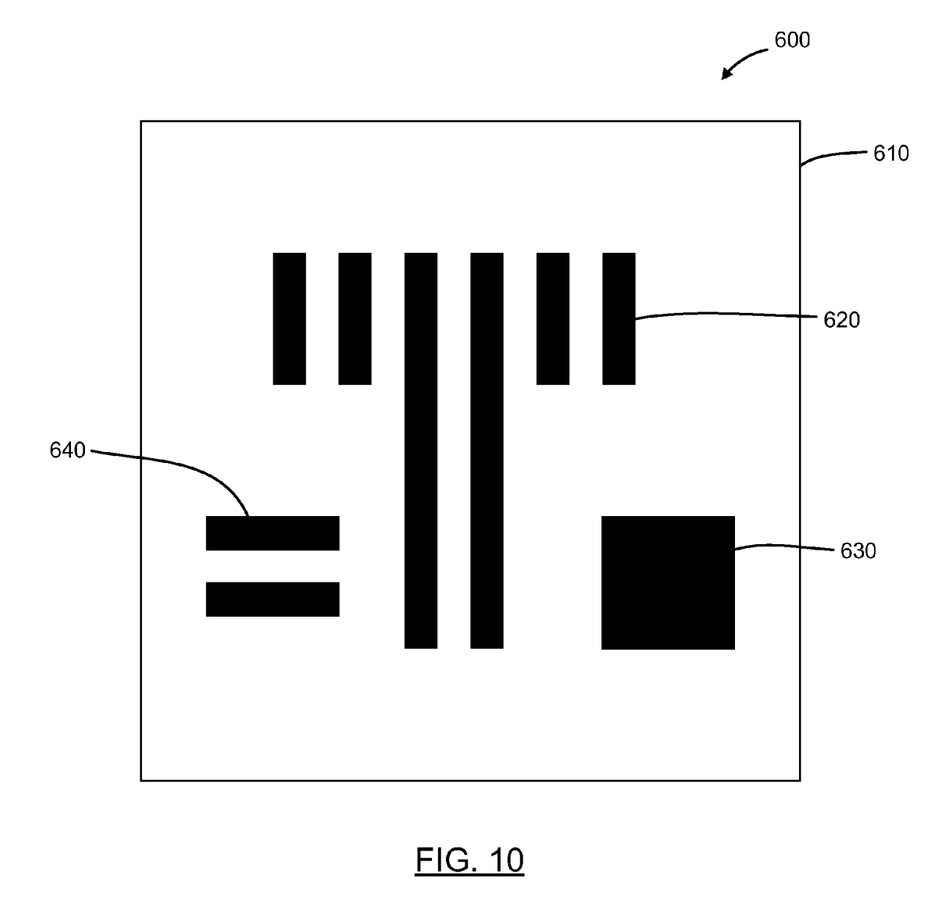
FIG. 10 is an exemplary graphical representation in one embodiment of an image produced when rendering a color image from a binary image file created by the process depicted in FIG. 4 using a computer with a standard viewer.

For example, a computer or system 10000 comprising, for example, one or more terminals 100, servers 200, servers 400, and client computers 500, that does not have a custom viewer capable of rendering a custom image file format by processing the file as described with reference to FIG. 4 may lack the ability to search the image data for patterns and convert those patterns into chosen colors. However, because each of the color ranges is represented by a different binary pattern, the image produced even without the custom decoding capabilities can have a useable representation of the original image. Accordingly, in step 770, an image may be rendered based on the binary pixel position values stored in the image data of the file. FIG. 10 is an exemplary graphical representation of an image rendered by a computer with a standard reader that lacks the pattern recognition and coloring capabilities described with regard to FIG. 8. Although spatial regions 620, 630 and 640 lack the color shown in the original image in FIG. 5, the visual effect created by the binary pattern applied to those pixel positions produces a useable likeness of the original image.

To fully render all of the processed image data, a computer with a customized viewer can be utilized. For example, in step 730, once processed image data from the binary file is read into volatile system memory 1080, the CPU 1060 can be instructed to search that binary image data for the various patterns assigned to the different color ranges. As patterns are identified, the pixel positions whose output pixel values constitute a part of a given pattern are indicated as being a part of a particular color range. Information on the binary patterns used can be located by the CPU 1060, for example, in the file header information or in some other storage medium internal or external to system 10000.

In step 740, the colors assigned to each color range can be determined, for example, from information in the file header, information retrieved from elsewhere within system 10000, by the CPU 1060 in response to other processing parameters, or through user input. Next, in step 750, each of the pixel positions can be assigned a color based on that pixel position's association with a particular color range. For example, with regard to frame 600 of FIG. 5, pixels positions in spatial region 610 would be assigned white, pixel positions in spatial region 620 would be assigned blue, pixel positions in spatial region 630 would be assigned green, and pixels positions in spatial region 640 would be assigned orange.

In step 760, the processed file information, which now maps each pixel position to a color, can be used to render the image, despite the original image having been processed into, stored, and retrieved from pure binary form. Because each of the pixel value ranges can be reproduced using any chosen color, different visual effects can be created in the rendered image to emphasize or downplay particular characteristics of the image in order to improve the usability and overall visual quality of the resulting image. For example, different colors can be applied to each of the pixel value ranges to embolden the visual appearance of particular features in the image. Additionally, digital signal processing techniques and filters can be applied to the resulting image to achieve different results and visual effects.

Each of the steps of the processes described with respect to FIGS. 4 and 9 can be performed individually by a CPU 1060 of image reading terminal 100, by server 200, by server 400, by client computer 500, or by a plurality of such computers, such as one or more of CPU 1060 of image reading terminal 100, server 200, server 400, or client computer 500 in a distributed computing environment. System 10000 or a computer of system 10000, e.g. a terminal 100, server 200, server 400, or client computer 500 can be operative to perform the processing described with reference to the flow diagrams of FIGS. 4 and 9 by making use of a computer program product comprising executable program code stored in a computer readable medium. In one embodiment, the program code can contain executable instructions that enable a computer of system 10000, or alternatively a plurality of computers of system 10000, to implement various functions as described with reference to FIGS. 4 and 9.

Additionally, methods and systems operative to process monochrome image data, as well as numerous additional method and apparatus elements, are set forth in U.S. application Ser. No. 12/947,076 filed on the filing date of the present application. The entirety of method and system elements described in U.S. application Ser. No. 12/947,076 can be utilized with the method and system elements set forth herein. U.S. application Ser. No. 12/947,076 is incorporated herein by reference.

Additional features of system 10000 are described with reference to the following example:

Example 1

In one example of how the disclosed techniques could be implemented on system 10000, a set of computer instructions capable of implementing the image data processing steps described with reference to FIGS. 4 and 9 can be deployed on a terminal 100 such that the instructions can be executed by CPU 1060. A user of terminal 100 would then be able to capture a raw frame of image data using terminal 100, which could then process that image data to map the color information for each pixel position to an input color index value, identify a number of color ranges to which each of the pixel positions are mapped based on the input color index value for each pixel position, and assign a binary output pixel value to each pixel position based on a spatial binary pattern associated with each assigned color range. Terminal 100 could then produce a custom file containing the processed image data and information concerning the patterns used and the colors that should be applied to each of the ranges. The image file produced could be stored in terminal 100, or saved to another data storage medium either internally within or externally to system 10000.

In particular, the image file could be processed by an existing legacy system designed to accept a binary file input. Because each pixel position is represented as a single binary value, namely a 1 or a 0, while retaining color information in the image through assignment of spatial binary patterns representative of colors to the pixel positions, the image file could be stored and processed by the legacy system, thereby facilitating integration between a modern color terminal 100 and a legacy system. In the event a legacy system has image file processing capabilities, an image file produced by terminal 100 could be customized to match the legacy format.

If the user subsequently wishes to view a stored image, a terminal 100 could retrieve the processed image file. A CPU 1060 could then read the binary image data into memory 1085 and search for patterns representative of the different color ranges. Each pixel position could then be assigned the color index value assigned to that pixel position's color range, the color index value can be converted to RGB color information, if needed, and the image could be rendered on the display 1140. If desired, similar processing capabilities could be developed for a legacy system to decode the binary pattern and render an image.

Because the image data is highly compressed, with each pixel position being represented by only one bit of data, the size of the processed image file can be small compared to other common image files. Accordingly, the file can be easily transferred between different media and systems either through some form of data storage medium or a wireless or landline network. The small file size can shorten the time needed to transfer image files over and between different data networks, and can also improve data reliability and result in fewer data errors. In some embodiments, colors can be initially selected for each color range and later manipulated and changed by the system 10000 or by a user to create a chosen visual effect or to improve the clarity, quality, or visibility of content in the image.

A small sample of systems, methods, and apparatus that are described herein is as follows:

A1. A method for representing a color image as binary data, comprising the steps of:

receiving a frame of color image data utilizing one or more computers, said color image data comprising a plurality of input pixel values corresponding to a plurality of pixel positions in an image, wherein said input pixel values are represented as N-bit values, and wherein N>1;

defining a plurality of color ranges utilizing said one or more computers;

assigning each of said pixel positions to one of said color ranges based on the input pixel value for that pixel position utilizing said one or more computers;

defining a plurality of spatial binary patterns utilizing said one or more computers, wherein each of said spatial binary patterns is different;

assigning each of said plurality of color ranges to one of said spatial binary patterns utilizing said one or more computers; and assigning to each of said pixel positions an output pixel value representative of said one of said spatial binary patterns assigned to said one of said color ranges assigned to that pixel position utilizing said one or more computers.

A2. The method of A1, wherein said input pixel values comprise RGB color scale components for each pixel position.

A3. The method of A2, wherein the step of receiving color image data further comprises the step of mapping said RGB color scale components for each pixel position to an input color index value for each of said pixel positions.

A4. The method of A1, wherein said input pixel values comprise an input color index value for each pixel position.

A5. The method of A1, further comprising the step of writing said output pixel values to a file.

A6. The method of A5, wherein said file comprises said output pixel values and a header comprising information on said spatial binary patterns.

A7. The method of A5, wherein said file comprises said output pixel values and a header comprising information on each of said color ranges and said spatial binary patterns assigned to each color range.

A8. The method of A5, wherein said file is in an industry standard file format.

A9. The method of A5 wherein said file is in a custom file format.

A10. The method of A1, wherein said steps are performed by a computer in response to a trigger actuation.

A11. The method of A1, wherein said steps are automatically performed by a computer in response to receiving said frame of color image data.

A12. The method of A5, further comprising the step of reading the data stored in said file and rendering an image using said data.

B1. A system for converting a color image to binary data, comprising:
one or more computers operative to:
receive a frame of color image data, said color image data comprising a plurality of input pixel values corresponding to a plurality of pixel positions in an image, wherein said input pixel values are represented as N-bit values, and wherein N>1;
define a plurality of color ranges;
assign each of said pixel positions to one of said color ranges based on the input pixel value for that pixel position;
define a plurality of spatial binary patterns, wherein each of said spatial binary patterns is different;
assign each of said plurality of color ranges to one of said spatial binary patterns; and
assign to each of said pixel positions an output pixel value representative of said one of said spatial binary patterns assigned to said one of said color ranges assigned to that pixel position.

C1. A computer program product for processing image data, said computer program product including:
a computer readable medium;
first program code for receiving a frame of color image data, said color image data comprising a plurality of input pixel values corresponding to a plurality of pixel positions in an image, wherein said input pixel values are represented as N-bit values, and wherein N>1;
second program code for defining a plurality of color ranges;
third program code for assigning each of said pixel positions to one of said color ranges based on the input pixel value for that pixel position;
fourth program code for defining a plurality of spatial binary patterns, wherein each of said spatial binary patterns is different;
fifth program code for assigning each of said plurality of color ranges to one of said spatial binary patterns; and
sixth program code for assigning to each of said pixel positions an output pixel value representative of said one of said spatial binary patterns assigned to said one of said color ranges assigned to that pixel position;
wherein said first, second, third, fourth, fifth and sixth program code is recorded on said computer readable medium.

C2. The computer program product of C1, wherein said input pixel values comprise RGB color scale components for each pixel position.

C3. The computer program product of C2, wherein the first program code for receiving color image data further comprises the program code for mapping said RGB color scale components for each pixel position to an input color index value for each of said pixel positions.

C4. The computer program product of C1, wherein said input pixel values comprise an input color index value for each pixel position.

C5. The computer program product of C1, further comprising seventh program code for writing said output pixel values to a file, wherein said seventh program code is recorded on said computer readable medium.

C6. The computer program product of C5, wherein said file comprises said output pixel values and a header comprising information on said spatial binary patterns.

C7. The computer program product of C5, wherein said file comprises said output pixel values and a header comprising information on each of said color ranges and said spatial binary pattern assigned to each color range.

C8. The computer program product of C5, wherein said file is in an industry standard file format.

C9. The computer program product of C1, wherein said first through seventh program code is executed by a computer in response to a trigger actuation.

C10. The computer program product of C1, wherein said first through seventh program code is executed by a computer in response to receiving said frame of color image data.

C11. The computer program product of C5, further comprising eighth program code for processing said file to render an image, wherein said eighth program code is recorded on said computer readable medium.

D1. A system for converting a color image to a binary file, comprising:
one or more computers, wherein said one or more computers is operative to transform an input frame of color image data having input pixel values expressed as N-bit values, wherein N>1, into a custom file format that is readable with both a standard reader program and a custom reader program, said one or more computers having said standard reader program and said custom reader program;
wherein in transforming said input frame of color image data said one or more computers is operative to assign pixel positions having input pixel values in a given color range output pixel values representative of a spatial binary pattern;
wherein the system is operative so that when said custom file format is read utilizing a standard reader, an image is rendered so that pixel positions represented by said spatial binary pattern appear as said spatial binary pattern;
wherein the system is operative so that when said custom file format is read utilizing a custom reader, an image is rendered so that pixel positions represented by said spatial binary pattern appear as color and without said spatial binary pattern.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements, it will be understood that such systems, apparatuses and methods can be practiced with fewer than or greater than the mentioned certain number of elements. As a particular example, while the term "computer" or "system" may herein sometimes be used alone for convenience, it is well understood that each of these could refer to any computing device, computing system, computing environment, or other information processing component, and is not limited to any individual interpretation. Also, while a number of particular embodiments have been described, it will be understood that features and aspects that have been described with reference to each particular embodiment can be used with each remaining particularly described embodiment.

We claim:

1. A method for representing a color image as binary data, comprising:
    receiving a frame of color image data utilizing one or more computers, said color image data comprising a plurality of input pixel values corresponding to a plurality of pixel positions in an image, wherein said input pixel values are represented as N-bit values, and wherein N>1;
    defining a plurality of color ranges utilizing said one or more computers;
    assigning each of said pixel positions to one of said color ranges based on the input pixel value for that pixel position utilizing said one or more computers;
    defining a plurality of spatial binary patterns utilizing said one or more computers, wherein each of said spatial binary patterns is different;
    assigning each of said plurality of color ranges to one of said spatial binary patterns utilizing said one or more computers; and
    assigning to each of said pixel positions an output pixel value representative of said one of said spatial binary patterns assigned to said one of said color ranges assigned to that pixel position utilizing said one or more computers.

2. The method of claim 1, wherein said input pixel values comprise RGB color scale components for each pixel position.

3. The method of claim 2, wherein the receiving color image data further comprises mapping said RGB color scale components for each pixel position to an input color index value for each of said pixel positions.

4. The method of claim 1, wherein said input pixel values comprise an input color index value for each pixel position.

5. The method of claim 1, further comprising the step of writing said output pixel values to a file.

6. The method of claim 5, wherein said file comprises said output pixel values and a header comprising information on said spatial binary patterns.

7. The method of claim 5, wherein said file comprises said output pixel values and a header comprising information on each of said color ranges and said spatial binary patterns assigned to each color range.

8. The method of claim 5, wherein said file is in an industry standard file format.

9. The method of claim 5 wherein said file is in a custom file format.

10. The method of claim 1, wherein said assigning to each of said pixel positions an output pixel value representative of said one of said spatial binary patterns is performed by a computer in response to a trigger actuation.

11. The method of claim 1, wherein said assigning to each of said pixel positions an output pixel value representative of said one of said spatial binary patterns is automatically performed by a computer in response to receiving said frame of color image data.

12. The method of claim 5, further comprising reading the data stored in said file and rendering an image using said data.

13. A system for converting a color image to binary data, comprising:
    one or more computers operative to:
    receive a frame of color image data, said color image data comprising a plurality of input pixel values corresponding to a plurality of pixel positions in an image, wherein said input pixel values are represented as N-bit values, and wherein N>1;
    define a plurality of color ranges;
    assign each of said pixel positions to one of said color ranges based on the input pixel value for that pixel position;
    define a plurality of spatial binary patterns, wherein each of said spatial binary patterns is different;
    assign each of said plurality of color ranges to one of said spatial binary patterns; and
    assign to each of said pixel positions an output pixel value representative of said one of said spatial binary patterns assigned to said one of said color ranges assigned to that pixel position.

14. A computer program product for processing image data, said computer program product including:
    a non-transitory computer readable medium;
    first program code for receiving a frame of color image data, said color image data comprising a plurality of input pixel values corresponding to a plurality of pixel positions in an image, wherein said input pixel values are represented as N-bit values, and wherein N>1;
    second program code for defining a plurality of color ranges;
    third program code for assigning each of said pixel positions to one of said color ranges based on the input pixel value for that pixel position;
    fourth program code for defining a plurality of spatial binary patterns, wherein each of said spatial binary patterns is different;
    fifth program code for assigning each of said plurality of color ranges to one of said spatial binary patterns; and
    sixth program code for assigning to each of said pixel positions an output pixel value representative of said one of said spatial binary patterns assigned to said one of said color ranges assigned to that pixel position;
    wherein said first, second, third, fourth, fifth and sixth program code is recorded on said computer readable medium.

15. The computer program product of claim 14, wherein said input pixel values comprise RGB color scale components for each pixel position.

16. The computer program product of claim 15, wherein the first program code for receiving color image data further comprises the program code for mapping said RGB color scale components for each pixel position to an input color index value for each of said pixel positions.

17. The computer program product of claim 14, wherein said input pixel values comprise an input color index value for each pixel position.

18. The computer program product of claim 14, further comprising seventh program code for writing said output pixel values to a file, wherein said seventh program code is recorded on said computer readable medium.

19. The computer program product of claim 18, wherein said file comprises said output pixel values and a header comprising information on said spatial binary patterns.

20. The computer program product of claim 18, wherein said file comprises said output pixel values and a header comprising information on each of said color ranges and said spatial binary pattern assigned to each color range.

21. The computer program product of claim 18, wherein said file is in an industry standard file format.

22. The computer program product of claim 14, wherein said first through seventh program code is executed by a computer in response to a trigger actuation.

23. The computer program product of claim 14, wherein said first through seventh program code is executed by a computer in response to receiving said frame of color image data.

24. The computer program product of claim 18, further comprising eighth program code for processing said file to render an image, wherein said eighth program code is recorded on said computer readable medium.

25. The method of claim 1, wherein pixel positions of the plurality of pixel positions correspond to pixel positions of an image sensor array.

* * * * *